United States Patent [19]

Lux

[11] Patent Number: 5,799,800

[45] Date of Patent: Sep. 1, 1998

[54] PROCESS AND INSTALLATION FOR SORTING INDIVIDUAL GOODS

[76] Inventor: Dietrich Lux, Oranienburger Chaussee 22b, Berlin, Germany, D-13465

[21] Appl. No.: 624,384

[22] PCT Filed: Oct. 13, 1994

[86] PCT No.: PCT/DE94/01244

§ 371 Date: Apr. 1, 1996

§ 102(e) Date: Apr. 1, 1996

[87] PCT Pub. No.: WO95/10368

PCT Pub. Date: Apr. 20, 1995

[30] Foreign Application Priority Data

Oct. 13, 1993 [DE] Germany ............. 43 35 637.0

[51] Int. Cl.⁶ ........................................... B07C 5/00
[52] U.S. Cl. ................. 209/559; 209/564; 209/583; 198/349.7; 198/350; 414/273; 414/285
[58] Field of Search ............... 209/546, 547, 209/552, 555, 556, 557, 559, 562, 563, 564, 576, 577, 583; 198/349.7, 350; 414/273, 285

[56] References Cited

U.S. PATENT DOCUMENTS

| | | | |
|---|---|---|---|
| 4,244,672 | 1/1981 | Lund | 198/350 |
| 4,907,699 | 3/1990 | Butcher et al. | 209/583 X |
| 5,058,750 | 10/1991 | Graese | 209/583 |
| 5,411,151 | 5/1995 | Sasada | 209/583 |

FOREIGN PATENT DOCUMENTS

| | | | |
|---|---|---|---|
| 21 10 390 | 9/1972 | Germany. | |
| 28 52 190 | 6/1980 | Germany. | |
| 41 18 164 | 12/1992 | Germany. | |
| 2 079 708 | 1/1982 | United Kingdom. | |
| 2 113 633 | 8/1983 | United Kingdom. | |
| 2224147 | 4/1990 | United Kingdom | 209/583 |

*Primary Examiner*—William E. Terrell
*Assistant Examiner*—Tuan N. Nguyen
*Attorney, Agent, or Firm*—Collard & Roe, P.C.

[57] ABSTRACT

The invention relates to a method for sorting individual articles having identification numbers. The method comprises the steps of allocating each individual article a position number based on a position in the stream of individual articles. Next, the individual articles are conveyed from one collecting zone to another via waiting lines. The collecting zones and waiting lines are designed so that the sorting installation configuration corresponds the equation: $M=(m.q.r)/n^2$. Wherein M equals the size of the sorting installation, m equals the number of waiting lines in the first collecting zone, q equals the capacity of a waiting line in the first collecting zone, n equals the number of waiting lines in each further collecting zone, and r equals the capacity of the waiting lines in the further collecting zones.

7 Claims, 8 Drawing Sheets

ALLOCATION OF 5 DILIVERY POINTS A, B, C, D, E n = 6 WAITING LINES

| P1 | P2 | P3 | P4 | P5 | P6 | |
|---|---|---|---|---|---|---|
| 211 | 212 | 213 | 214 | 215 | 216 | Z 36 |
| 205 | 206 | 207 | 208 | 209 | 210 | Z 35 |
| 199 | 200 | 201 | 202 | 203 | 204 | Z 34 |
| 193 | 194 | 195 | 196 | 197 | 198 | Z 33 |
| 187 | 188 | 189 | 190 | 191 | 192 | Z 32 |
| 181 | 182 | 183 | 184 | 185 | 186 | Z 31 |
| 175 | 176 | 177 | 178 | 179 | 180 | Z 30 |
| 169 | 170 | 171 | 172 | 173 | 174 | Z 29 |
| 163 | 164 | 165 | 166 | 167 | 168 | Z 28 |
| 157 | 158 | 159 | 160 | 161 | 162 | Z 27 |
| 151 | 152 | 153 | 154 | 155 | 156 | Z 26 |
| 145 | 146 | 147 | 148 | 149 | 150 | Z 25 |
| 139 | 140 | 141 | 142 | 143 | 144 | Z 24 |
| 133 | 134 | 135 | 136 | 137 | 138 | Z 23 |
| 127 | 128 | 129 | 130 | 131 | 132 | Z 22 |
| 121 | 122 | 123 | 124 | 125 | 126 | Z 21 |
| 115 | 116 | 117 | 118 | 119 | 120 | Z 20 |
| 109 | 110 | 111 | 112 | 113 | 114 | Z 19 |
| 103 | 104 | 105 | 106 | 107 | 108 | Z 18 |
| 097 | 098 | 099 | 100 | 101 | 102 | Z 17 |
| 091 | 092 | 093 | 094 | 095 | 096 | Z 16 |
| 085 | 086 | 087 | 088 | 089 | 090 | Z 15 |
| 079 | 080 | 081 | 082 | 083 | 084 | Z 14 |
| 073 | 074 | 075 | 076 | 077 | 078 | Z 13 |
| 067 | 068 | 069 | 070 | 071 | 072 | Z 12 |
| 061 | 062 | 063 | 064 | 065 | 066 | Z 11 |
| 055 | 056 | 057 | 058 | 059 | 060 | Z 10 |
| 049 | 050 | 051 | 052 | 053 | 054 | Z 09 |
| 043 | 044 | 045 | 046 | 047 | 048 | Z 08 |
| 037 | 038 | 039 | 040 | 041 | 042 | Z 07 |
| 031 | 032 | 033 | 034 | 035 | 036 | Z 06 |
| 025 | 026 | 027 | 028 | 029 | 030 | Z 05 |
| 019 | 020 | 021 | 022 | 023 | 024 | Z 04 |
| 013 | 014 | 015 | 016 | 017 | 018 | Z 03 |
| 007 | 008 | 009 | 010 | 011 | 012 | Z 02 |
| 001 | 002 | 003 | 004 | 005 | 006 | Z 01 |

$r = n^2 = 6^2 = 36$ WAITING POSITIONS PER WAITING LINE 01 02 03 04 05 06 07 08 09 10 ---

FIG. 3 n = 6 WAITING LINES r = 36 WAITING POSITIONS PER WAITING LINE

FIG. 4

FIG. 5 m = 9 WAITING LINES q = $n^3$ = $6^3$ = 216 WAITING POSITIONS PER WAITING LINE

| | | | |
|---|---|---|---|
| 01 | AK 1 | T 1 | S 1 |
| 02 | " | " | S 2 |
| 03 | " | " | S 3 |
| 04 | " | T 2 | S 1 |
| 05 | " | " | S 2 |
| 06 | " | T 3 | S 1 |
| 31 | AK 2 | " | S 1 |
| 32 | " | " | S 2 |
| 33 | " | " | S 3 |
| 34 | " | " | S 4 |
| 35 | " | " | S 5 |
| 36 | " | " | S 6 |
| 61 | " | " | S 7 |
| 62 | " | T 2 | S 1 |
| 63 | " | " | S 2 |
| 64 | " | " | S 3 |
| 65 | " | T 3 | S 1 |
| 66 | " | " | S 2 |
| 91 | " | T 4 | S 1 |
| 92 | " | " | S 2 |
| 93 | " | T 5 | S 1 |
| 94 | " | " | S 2 |
| 95 | " | T 6 | S 1 |
| 96 | " | T 7 | S 1 |
| 121 | AK 3 | T 1 | S 1 |
| 122 | AK 4 | T 1 | S 1 |
| 123 | AK 5 | T 1 | S 1 |
| 124 | " | " | S 2 |
| 125 | " | " | S 3 |
| 126 | " | T 2 | S 1 |
| 151 | " | " | S 2 |
| 152 | " | " | S 3 |
| 153 | " | " | S 4 |
| 154 | " | " | S 5 |
| 155 | " | " | S 6 |
| 156 | " | " | S 7 |
| 181 | " | " | S 8 |
| 182 | " | " | S 9 |
| 183 | " | T 3 | S 1 |
| 184 | " | " | S 2 |
| 185 | " | T 4 | S 1 |
| 186 | " | " | S 2 |
| 211 | " | T 5 | S 1 |
| 212 | " | " | S 2 |
| 213 | " | " | S 3 |
| 214 | AK 6 | T 1 | S 1 |
| 215 | AK 7 | T 1 | S 1 |
| 216 | " | " | S 2 |

L2-A

| | | | |
|---|---|---|---|
| 241 | " | " | S 3 |
| 242 | " | T 2 | S 2 |
| 243 | " | " | S 2 |
| 244 | AK 8 | T 1 | S 1 |
| 245 | " | " | S 2 |
| 246 | " | " | S 3 |

L1-B

| | | | |
|---|---|---|---|
| 07 | | | |
| 08 | BK 1 | T 1 | S 1 |
| 09 | " | " | S 2 |
| 10 | " | T 2 | S 1 |
| 11 | " | " | S 2 |
| 12 | " | " | S 3 |
| 37 | " | " | S 4 |
| 38 | " | " | S 5 |
| 39 | " | " | S 6 |
| 40 | " | " | S 7 |
| 41 | " | " | S 8 |
| 42 | " | T 3 | S 1 |
| 67 | BK 2 | T 1 | S 1 |
| 68 | " | " | S 2 |
| 69 | BK 3 | T 1 | S 1 |
| 70 | " | " | S 2 |
| 71 | " | T 2 | S 1 |
| 72 | " | " | S 2 |
| 97 | " | " | S 3 |

FIG. 7

PACK POSITIONS

SORTING ZONES

PROCESS AND INSTALLATION FOR SORTING INDIVIDUAL GOODS

BACKGROUND OF THE INVENTION

1. Field of the Invention

The invention relates to a method of sorting piece goods of any type such as articles of clothing, small parts, pallets, mail, medicament packages, etc. and to a sorting installation for sorting these piece goods.

2. The Prior Art

Sorting installations for items are known from the state of the art in which different individual articles are to be supplied as an ordered combination of the individual articles to a specific receiving group at the end of the sorting process. For example, articles of clothing washed for various customers are to be returned to the individual firms in an ordered state after the common washing process; or various pharmacies are to be sorted with medicaments from the wholesale warehouse in the desired combination according to patients and are to be supplied in the sequence in which the pharmacies are supplied. Known sorting methods have the decisive drawback that the throughput achieved by the sorting installation varies greatly and is much lower overall than the capacity of the conveyors linked to the sorting installation because the "items" to be sorted and the "loads" assembled from them can be of different sizes and considerable waiting times therefore arise in the item collecting systems of the sorting installation because sorting is carried out substantially by successive distributing processes.

SUMMARY OF THE INVENTION

As the invention is to be illustrated, in particular with reference to an example of a laundry for hired occupational clothing, the known procedure is also to be adopted in this sphere. The procedure is carried out in such a sorting installation in that a plurality of soiled articles of clothing belonging to several customers and collected in protective sacks is supplied to the laundry daily and, after being washed, is returned or allocated to the individual customers some time later in the sequence requested by the customer, for example according to wearer, matching of the articles of clothing (jacket/trousers), cupboard number, pigeon-hole, etc. For this purpose, the following stages are necessary in a typical specialist laundry with a throughput of about 18,000 articles of clothing per layer:

1) The articles of clothing are removed from the protective sacks in the laundry. The individual identification number fastened securely in each item of clothing is read and stored in the inventory management computer. All articles of clothing belonging to a customer are read in each case before articles of clothing belonging to the next customer are recorded.

2) The articles of clothing are sorted after recording according to type of fabric, colour, types and intensities of soiling and are collected separately in conveying containers. The loading volume of a conveying container corresponds to a "washing load" of the plurality of similar washing machines operating in parallel.

3) Washing loads with the same sorting criterion are washed in succession at the adjusted machine rate. A change to a different sorting criterion entails a changeover of the washing machine to a different washing process. Losses of throughput occur during each changeover as idle rates have to be included.

4) To keep the number of changeovers per layer to a minimum, the partial stream passing from the identification positions to the sorting station is divided into equal-size "sortable loads" comprising about 2,000 articles of clothing.

5) With the average capacity of about 18,000 articles of clothing per layer, the articles of clothing appearing in loads after the washing machines are picked up individually by several operators working in parallel and are placed on clothes hangers for transportation. The transportation hanger is located in a catch from which it is automatically received by a hanger conveyor after being released by the operator.

6) The identification number fastened in the article of clothing, for example coded as a bar code, is read by a scanner and recorded in the control computer of the hanger sorting installation together with the location number of the catch.

7) The hanger sorting installation consists of the three successive functional sections "storage area", "three-stage sorting cascade" and "output buffer", which are connected to one another by a hanger transporting installation, starting from the stations where the articles of clothing are placed on the transportation clothes hanger. The storage area is split into three storage regions connected in parallel for holding a total of three sortable loads which each comprise about 2,000 loaded transportation clothes hangers. Each storage region is formed by ten waiting lines which are connected in parallel and can each receive a maximum of 230 hangers.

The three-stage sorting cascade consists of three successive waiting regions. Each waiting region is formed by a different number ranging from 5 to 15 waiting lines which are connected in parallel and can each hold a maximum of 80 hangers. Each waiting line is divided into two successive equal-size waiting sections.

The output buffer consists of 5 to 7 waiting lines which are connected in parallel and which can each hold a maximum of 80 hangers.

8) According to the required throughput of about 18,000 articles of clothing per 10/hour-layer, the capacity of the hanger transporting installation should be designed for a minimum of 1,800 hangers per hour to minimize wear and malfunctioning.

According to the state of the art, sorting installations designed for such tasks were formerly operated at conveying speeds which, when in full use, allow a capacity of, for example, more than 2,100 hangers per hour and, despite generous dimensioning of the waiting regions of the sorting cascade stages with, for example, a total of 26 waiting lines (15+5+6), only attain a markedly varying throughput of, for example, only 1,200 hangers per hour on average, sorted according to a predetermined sequence.

This low sorting system efficiency of less than 60% (installed capacity in relation to achieved throughput) is due to the fact that sorting is carried out as successive distributing processes. The maximum of 230 hangers collected on a waiting line in the storage area is distributed in the first stage by customer matching over the, for example, 15 waiting lines of the first sorting cascade in each case then the maximum of 40 hangers collected there on a respective waiting line by wearer matching is distributed over the, for example, 5 waiting lines of the second sorting cascade in the second stage, and a maximum of 40 hangers collected there on a respective waiting line according to the predetermined stack sequence is distributed in the third stage over the, for example, 6 waiting lines of the third sorting cascade. Depending on the quantitative structure of a sortable load—number of customers, number of wearers per customer, number of articles of clothing per wearer—the waiting lines are occupied in the sequence of the successive functional regions with numbers of hangers which are decreasing on average and vary markedly from waiting line to waiting line. The respectively greater number of hangers to be conveyed simultaneously into or out of a sorting cascade stage defines the time required for this stage of the distributing process. Owing to the interlinking of the stages of the distributing process, the instantaneously greatest group of hangers to be split in the three-stage sorting cascade determines the total throughput.

With this type of sorting, it is only possible to collect, on a waiting line in the storage area, hangers with articles of clothing belonging to the number of different customers corresponding to the number of waiting lines available in the first sorting cascade stage, for example 15. Furthermore, it is only possible to collect, on a waiting line of the first sorting cascade stage, hangers having articles of clothing from the number of different wearers corresponding to the number of waiting lines available in the second sorting cascade stage, for example 5. Moreover, the number of articles of clothing per wearer must not be greater than the waiting lines available in the last sorting cascade stage, for example 6.

The hangers belonging to a customer are therefore transported to the wearer in the predetermined sequence and articles of clothing are all transported in succession into the proposed waiting line of the output buffer comprising a total of, for example, 5 waiting lines with the installed capacity of, for example, 2,100 hangers per hour. In the case of customers having greater numbers of hangers, the holding capacity of the waiting lines is rapidly exhausted, so hangers belonging to one customer have to be diverted to other waiting lines if the entire sorting procedure is not to be temporarily stopped. However, the sequence of hangers produced according to plan in the sorting procedure would then be destroyed to an unforeseeable extent, depending on these states of the installation which occur by chance.

The object of the invention is to eliminate the drawbacks of known sorting installations and methods and, in particular, to guarantee a uniform quantitative throughput of the individual articles with waiting regions which are smaller overall in design in the three sorting cascades during automatic sorting of the individual articles in a predetermined sequence, independently of the number and quantitative structure of the sorting features to be considered and to provide a method and an installation for this purpose.

According to the invention, the method of sorting individual articles with a sorting system formed by collecting zones which consist of several waiting lines and are connected to a continuous conveyor, a control system, deflecting systems before the waiting lines and also consisting of one or more delivery stations within a delivery system after the collecting zones, wherein the individual articles to be sorted are provided with identification numbers containing several identification features of the individual article in coded form and wherein the identification number is read by the control system and evaluated for control of the individual articles by the sorting system, is characterized in that it has the following features:

(a) after detection of the identification number and before entry into the first collecting zone, each individual article is allocated a position number via a control system according to the desired position in the stream of individual articles conveyed from a fourth collecting zone according to feature (e) to the numerically predetermined number of delivery stations;

(b) a first collecting zone adapted to the load size(s) of the individual articles to be sorted holds all individual articles, provided with a position number, from one or more loads in a sequence which is arbitrary but is recorded in the control system, and the individual articles entering the first collection zone are distributed over m waiting lines according to a first component of the position number, each waiting line having a holding capacity of q individual articles and m and q being integers;

(c) the individual articles are conveyed from the waiting lines of the first collecting zone through the connecting continuous conveyor to a second, third and fourth collecting zone with a number n of waiting lines in each collecting zone with further differentiating distribution according to a second, third and fourth component of the position number, the waiting lines having a respective holding capacity r, and r and n being integers;

(d) via the control system, $q=n^3$ individual parts are supplied to each individual waiting line in the first collecting zone and $r=n^2$ individual articles to each individual waiting line in the second, third or fourth collecting zone;

(e) the individual articles present in the waiting lines in an ordered sequence owing to the multi-stage distribution procedure are supplied from the fourth collecting zone to a delivery system in which a delivery station invariably only holds individual articles which are to be sorted and correspond to the predetermined fifth component of the position number, and delivery takes place in the sequence of desired identification features;

(f) the collecting zones and waiting lines are designed so that the sorting installation configuration corresponds to the equation $$M = \frac{m \cdot q \cdot r}{n^2}$$

wherein
M=size of the sorting installation (sortable load)
m=number of waiting lines in the first collecting zone
q=capacity of a waiting line in the first collecting zone
n=number of waiting lines in each further collecting zone
r=capacity of the waiting lines in the further collecting zones.

It is particularly important that the load size according to the invention results from the product of m, n, q and r divided by $n^3$, i.e. the above-mentioned equation applies.

According to the invention, identical first, second, third, fourth components of the position number are stored in the same waiting line or as identically allocated waiting lines of the first, second, third, fourth collecting zone.

The delivery from the fourth collecting zone takes place individually, group-wise, every waiting line, in parallel or serially, according to the fifth component of the position number.

The following definitions are necessary for carrying out the method according to the invention (1) the definition of a batch as sortable load with a constant value (2) the definition of the conveying capacity of the continuous conveyor (3) the holding capacity of the first collecting zone as a multiple of the batch of sortable load (1)

(4) the number of waiting lines in the first collecting zone (5) the number of waiting lines in the following three collecting zones (6) the number of delivery points, the desired timing of the individual articles or groups of individual articles issuing via the delivery points.

The position number to be allocated according to the invention reproduces the sequence of individual articles to be sorted and therefore also corresponds to the desired position of the individual article at the end of the sorting procedure.

Independently of the number and quantitative structure of the sorting features, the sorting capacity (articles per minute) is constant and corresponds to the installed conveying capacity of the selected conveyors, i.e. 100% utilization of the installation is achieved with the method according to the invention. In addition, the installed holding capacities of the collecting zones of which a total of only four is required—derived clearly and relevantly from the size (number of articles) of the selected constantly great batches to be sorted—are repeatedly completely occupied in the sorting procedure, but never overflow, i.e. 100% of the installation is utilized. As an additional advantage, the residence time of the batch in the sorting procedure is defined and produced by the design of the holding capacity of the first collecting zone arranged in the sorting procedure, i.e. the sorting procedure is carried out without restrictive requirements with a constant system capacity (throughput, residence time) and minimal production costs.

The invention therefore ensures that, at any moment of the sorting procedure with a continuous supply of individual articles, the issuing ordered stream of articles (articles per minute) is the same size as the arriving non-ordered stream of articles (articles per minute) independently of the mixing on the arriving side or the requirements imposed on the sequence on the issuing side.

The same time interval is invariably maintained between the moment of admission of the first or last article of a non-ordered batch into the sorting procedure and the moment of discharge of the first or last article of the now ordered batch from the sorting procedure.

The invention also relates to a sorting installation for sorting individual articles over collecting zones and waiting lines connected to a continuous conveyor, characterized by the following features (a) a reader as a component of a control system for reading an identification number which is a code for specific identification features on an individual article to be sorted;

(b) an allocation system as a component of a control system for allocating the identification number to a position number containing the desired position in the stream of individual articles in the following collecting zones, waiting lines and delivery points;

(c) a first collecting zone adapted to the load size(s) of the individual articles to be sorted for holding all individual articles provided with a position number from one or more loads in a sequence which is arbitrary but is recorded by the control system;

(d) first deflecting systems over m waiting lines in the first collecting zone for the individual articles according to a first component of the position number which is a presorting feature, each waiting line having a holding capacity q for the article to be sorted and m and q being integers;

(e) first conveyors for the individual articles from the waiting lines of the first collecting zone to a second, third and fourth collecting zone with a number n of waiting lines in each collecting zone according to a second, third and fourth component of the position number which is a further differentiating presorting feature in each case, the waiting lines having a respective holding capacity r, and n and r being integers;

(f) second, third and fourth deflecting systems for the deflection of the individual articles onto the corresponding waiting lines in the second, third and fourth collecting zone;

(g) control elements as components of a control system with a limit to the input individual articles such that the numerically constantly large load contains a number of individual articles corresponding to those issuing from the sorting installation in a predetermined sequence and blockage after holding $q=n^3$ individual articles in each individual waiting line in the first collecting zone and after holding $r=n^2$ individual articles in each individual waiting line in the second, third or fourth collecting zone;

(h) after the fourth collecting zone, a delivery system with several numerically defined delivery points for the presorted individual articles with a second allocation system as a component of the control system for allocating the position number to the specific delivery point corresponding to the predetermined fifth component of the position number.

According to the invention, the load size corresponds to the product m, n, q, r, divided by $n^3$.

For the sorting installation according to the invention, the conveyors, control systems, control elements, deflecting systems, delivery systems contained as functional elements have to be adapted to the respective conveyed products, but this is an occupational procedure for the skilled person in the sphere of conveying.

The invention will be described in detail hereinafter with reference to examples. The description relates essentially to the sorting operation in a laundry for rented occupational clothing, but is not restricted to this.

DETAILED DESCRIPTION OF THE PREFERRED EMBODIMENT

The invention is best described through the following examples.

EXAMPLE 1

In a laundry for hired occupational clothing, the soiled articles of clothing supplied are recorded in the conventional manner according to fabric, colour, degree of soiling etc., are then sorted, separated, washed as a washing load and subsequently placed on transportation clothes hangers. The hanger is then hung on a special hanger carrier and transferred into a continuous conveyor. The identification number (identnr.) fastened in the article of clothing is coded as a bar code, read by a scanner and recorded by central control computer.

The following definitions apply to the following procedure:

1. A sortable load is formed from the batches forming the stream of articles, the sortable load being fixed, for example, at a constant M=1,944 hangers.

2. The conveying capacity of the hanger conveyor is fixed at 1,800 hangers per hour, so the sorting capacity is also fixed at 1,800 hangers per hour.

3. The holding capacity of the first collecting zone= "passage store" is fixed at 3 sortable loads, that is 3×M=3× 1,944 hangers=5,832 hangers, so the average residence time of a sortable load in the passage store is also defined and is calculated as $$\frac{1,944 \text{ hangers}}{1,800 \text{ hangers/hour.}} \times (1/2 + 1 + 1/2) = 2.16 \text{ hours}$$

4. The passage store is divided into 3×m=3×9=27 waiting lines for holding q=216 hangers each; that is 5,832 hangers: 27=216 hangers.

5. The following three collecting zones="customer sorting", "wearer presorting", "wearer final sorting" are fixed in each case at n=6 waiting lines for holding 2×r=2× $n^2$=2×36 hangers each; that is a total of 2×(36 hangers×6) =2×(216 hangers).

6. It is decided to convey rows of a constant 6 hangers in succession in a constant rhythm in each case to the 5 delivery points; the constant average time interval between 2 rows at a delivery point is therefore calculated as $$\frac{1,800 \text{ hangers/hour}}{5 \text{ stations} \times 6 \text{ hangers/row}} = 60 \text{ rows/hour and station}$$

That is: average time interval between two rows=1 minute.

7. It is found that the hangers with the same primary sorting feature="customer number" are all conveyed only to one and the same delivery station.

8. It is found that the hangers in a 6th row are conveyed in parallel with an article from each waiting line from the fourth collecting zone comprising a total of 6 waiting lines=carrier final sorting.

Figure 1:
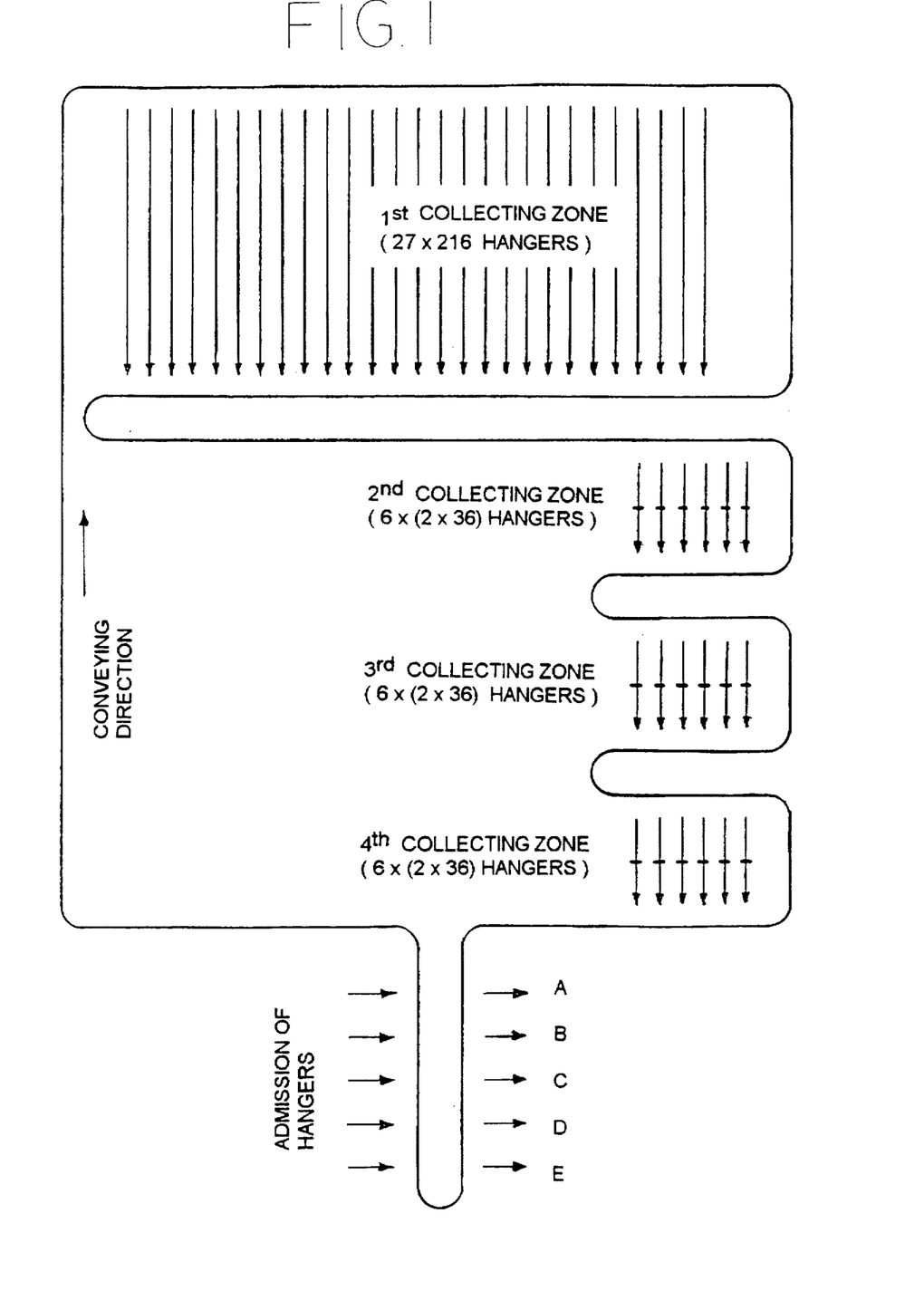
FIG. 1 shows a sorting installation in the embodiment in a laundry for hired occupational clothing.
Figure 2:
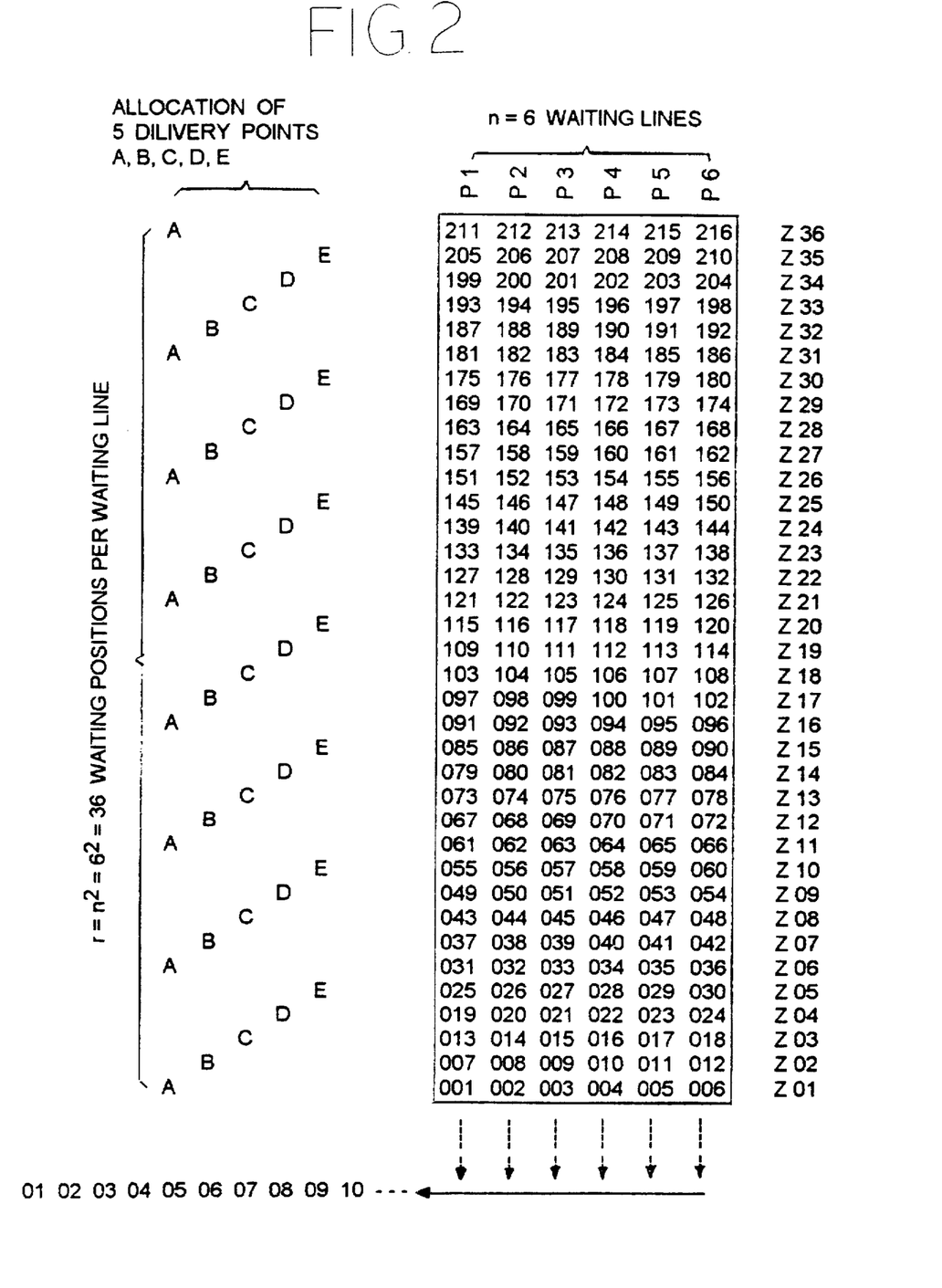
FIG. 2 shows conveyed individual articles portrayed as numerals (position numbers) in the fourth collecting zone according to FIG. 1 with n=6 waiting lines and $r=n^2=36$ waiting positions per waiting line.

This results overall in the run of position numbers shown in FIG. 2 in the fourth and last collecting zone from which the individual articles flow in the increasing sequence of the position numbers.

Figure 3:
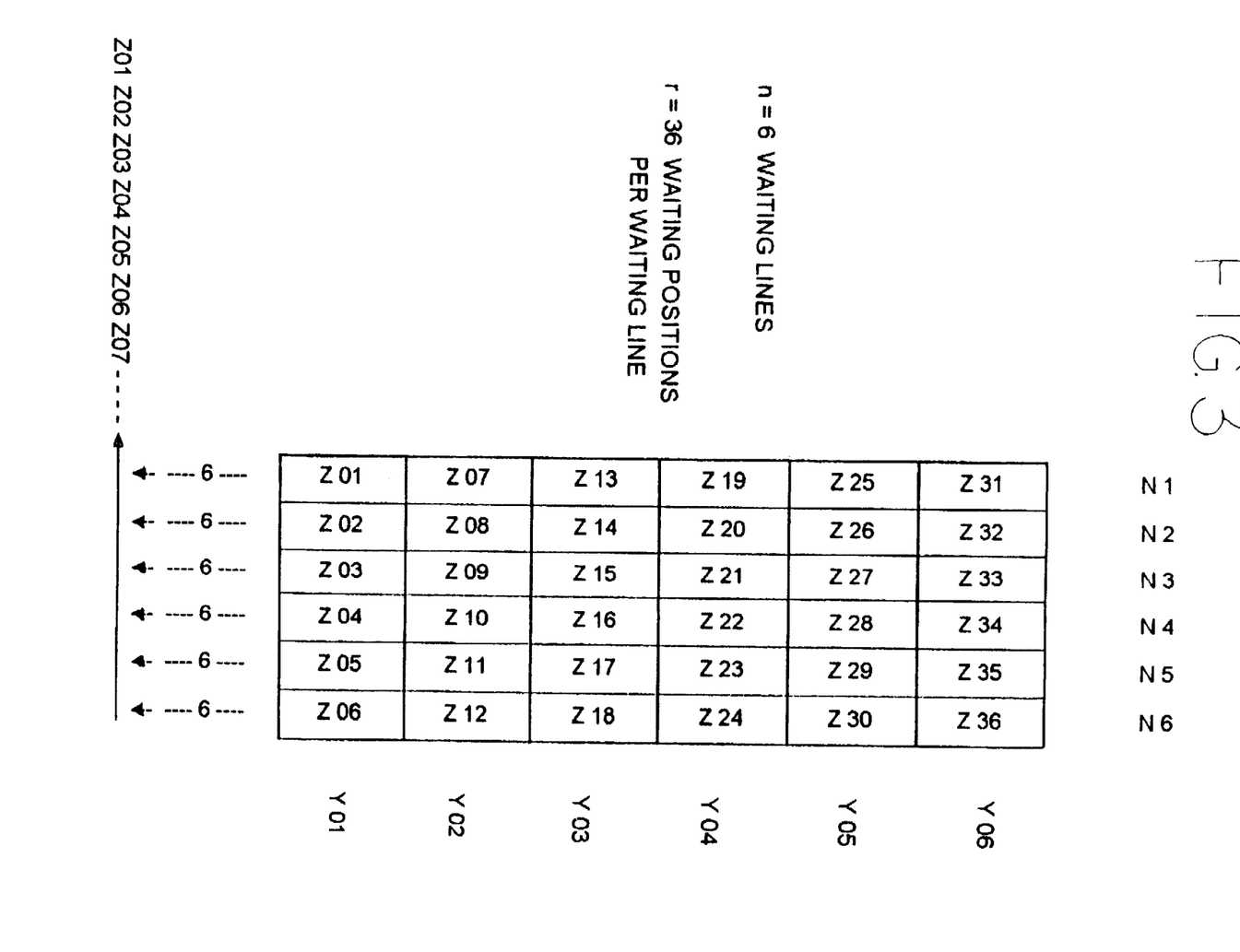
FIG. 3 shows conveyed individual articles portrayed as numerals (position numbers) in the third collecting zone according to FIG. 1 with 6 waiting lines and 36 waiting positions per waiting line.
Figure 4:
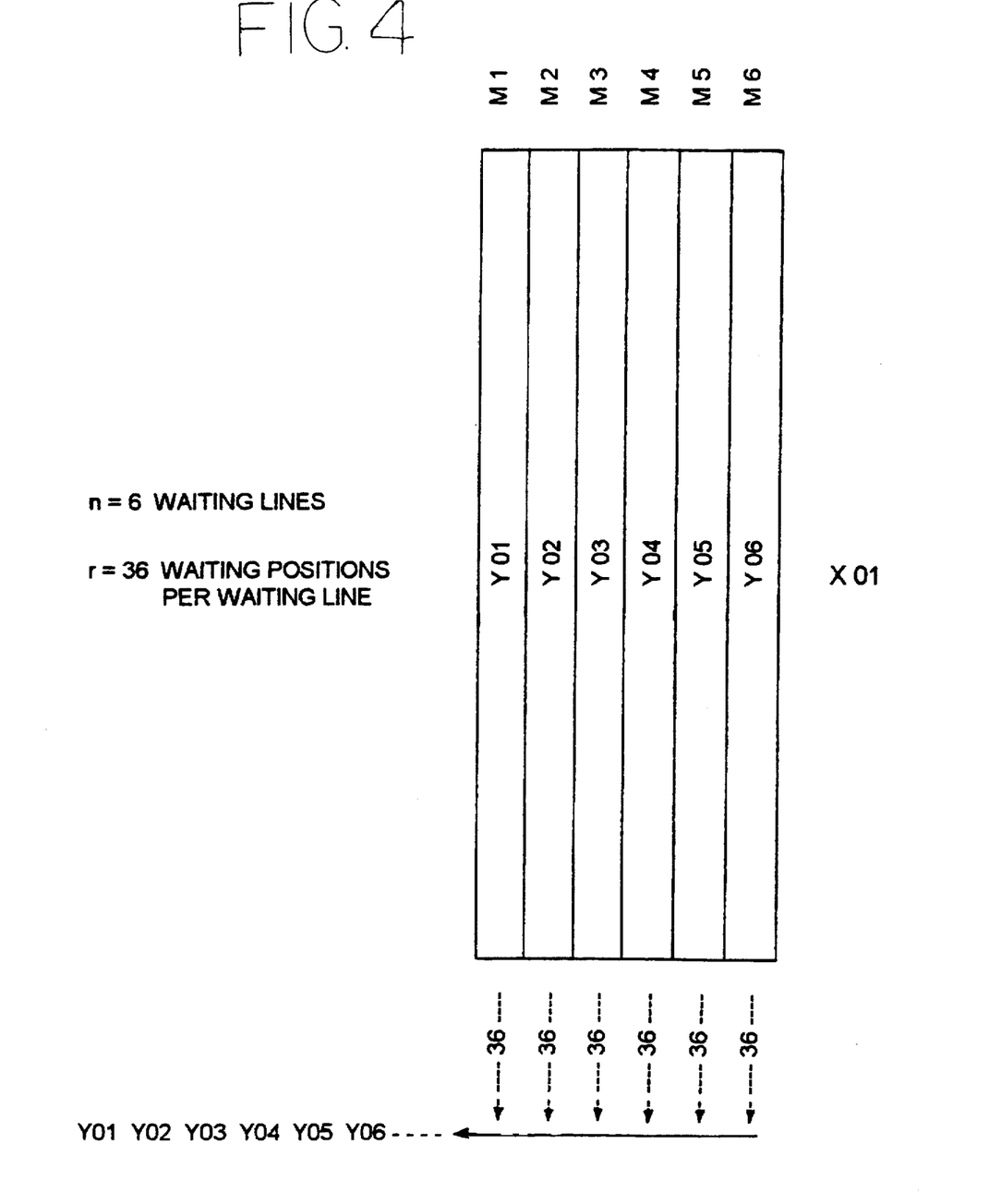
FIG. 4 shows conveyed individual articles portrayed as numerals (position numbers) in the second collecting zone according to FIG. 1 with 6 waiting lines and 36 waiting positions per waiting line.
Figure 5:
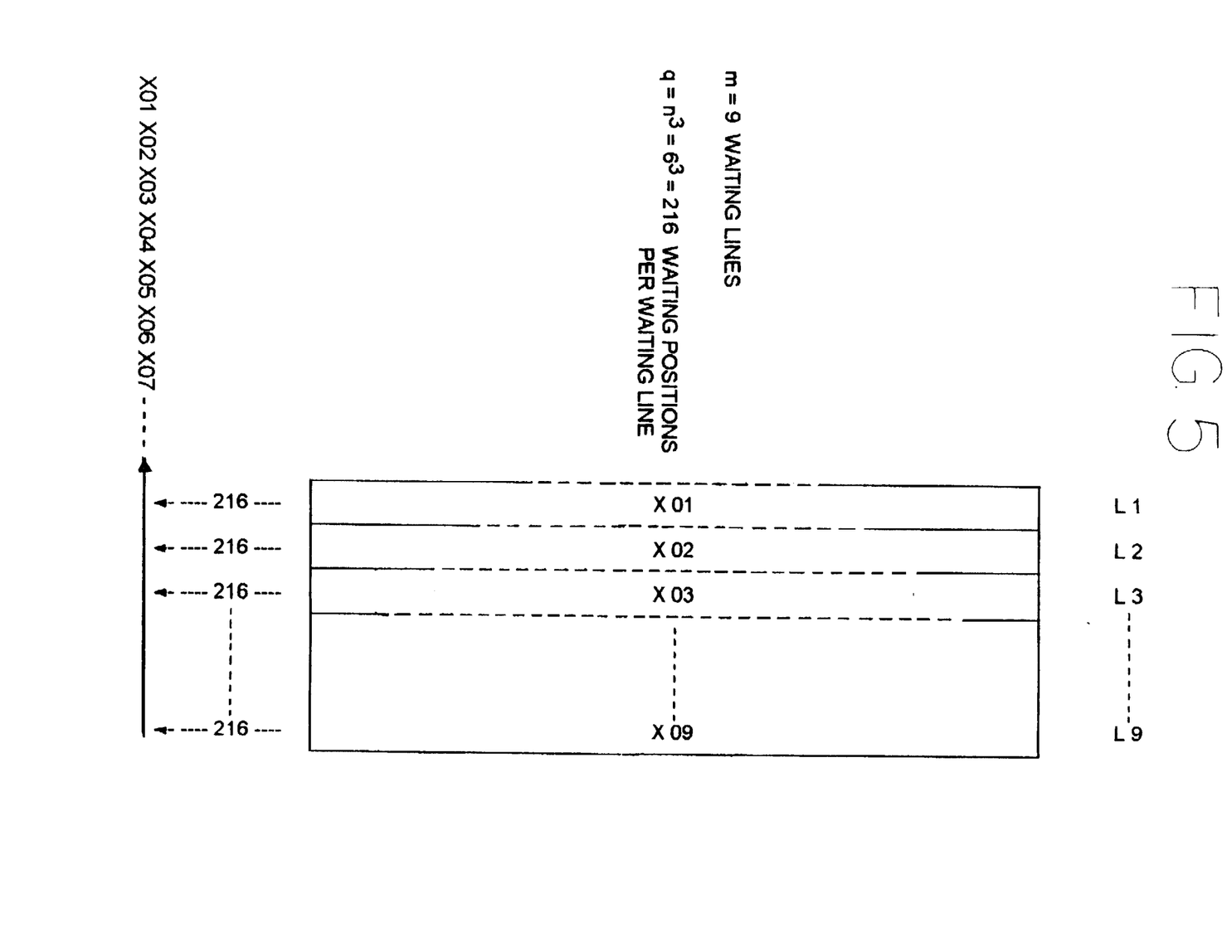
FIG. 5 shows conveyed individual articles portrayed as numerals (position numbers) in the first collecting zone according to FIG. 1 with 9 waiting lines (m) and 216 waiting positions per waiting line ($q=n^3=6^3=216$).
Figure 6:
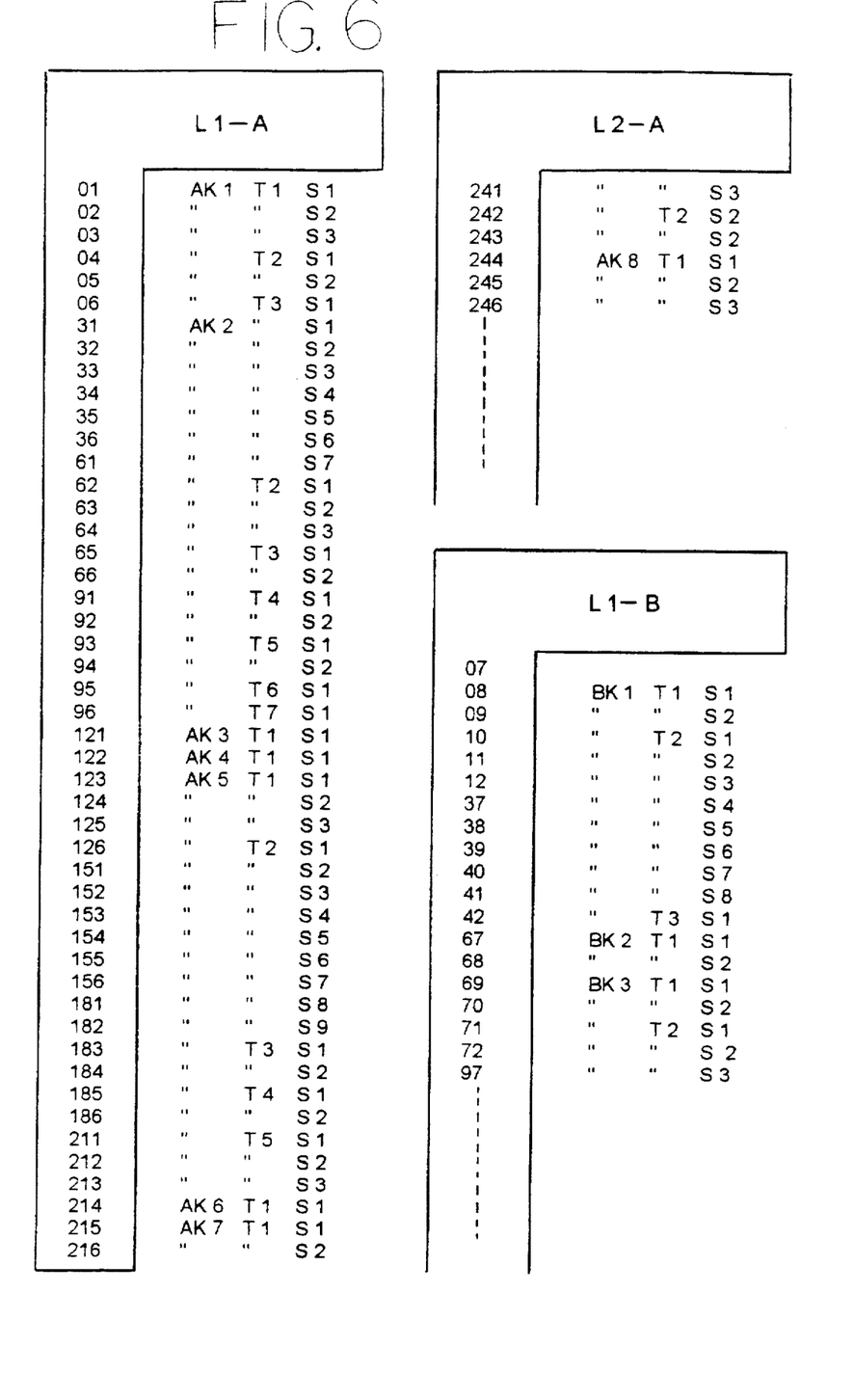
FIG. 6 shows the allocation of the position number to the identification number K (customer), T (wearer), S (article) with the egress of individual articles in the sequence K(1, 2, . . . ) T(1, 2, . . . ) S(1,2, . . . ) via the delivery points A or B, C, D.

If, for example, an article of clothing with identification number AK 5, T 4, S 2 is to leave a delivery station as the 186th article in a row of 216 articles according to the above-mentioned definitions, it is allocated position number 186 (FIG. 6). This means that, according to the division of five delivery points and 36 waiting positions per waiting line (FIG. 2), the article of clothing carries number Z 31 in waiting line P 6 (as a component of the position number). All individual articles with Z 31 come from the waiting line N 1 of the previous (3rd) collecting zone and additionally carry the number Y 06 (as a further component of the position number) (FIG. 3). All individual articles with Y 06 come from the waiting line M 6 of the previous (2nd) collecting zone and additionally carry the number X 01 (as a further component of the position number) (FIG. 4). All individual articles with X 01 come from the waiting line L 1 of the previous (1st) collecting zone (FIG. 5).

As a result, an article with the position number 186 with the additional coding X 01, Y 06, Z 31 as part of the position number, has to pass the corresponding waiting lines L 1, M 6, N 1, P 6 provided for it in the first to fourth collecting zone in order to leave the delivery station in the desired sequence as the 186th article of clothing.

During this procedure, each collecting zone continuously contains no more than the number of hangers which is possible according to the invention, the individual waiting lines are uniformly utilized, and the hangers issue uniformly at the delivery stations and in the desired sorting sequence.

In this way, the desired final position for each article of clothing can be defined according to the sorting procedure in the four collecting zones and in the context of the limited waiting lines in these collecting zones.

The waiting lines are formed, for example, by inclined rods on which the hangers released from the carriers of a circular conveyor slide downwards until they are held on a catch so subsequent hangers are held on the rod. The catch can be designed in such a way that, when a carrier passes on the circular conveyor which is also guided past the rod-shaped slide on this side, a hanger is latched in the carrier. The release and latching process is triggered by the control system.

If the control system is designed as a computer and if the input identification numbers are recorded therein, this computer can also allocate position numbers.

EXAMPLE 2

The invention is also described with reference to an automatic commissioning warehouse, for example for supplying a pharmacy with pharmaceutical products in small packages or supplying factories with screws in small packages or supplying retailers with cigarettes.

Figure 7:
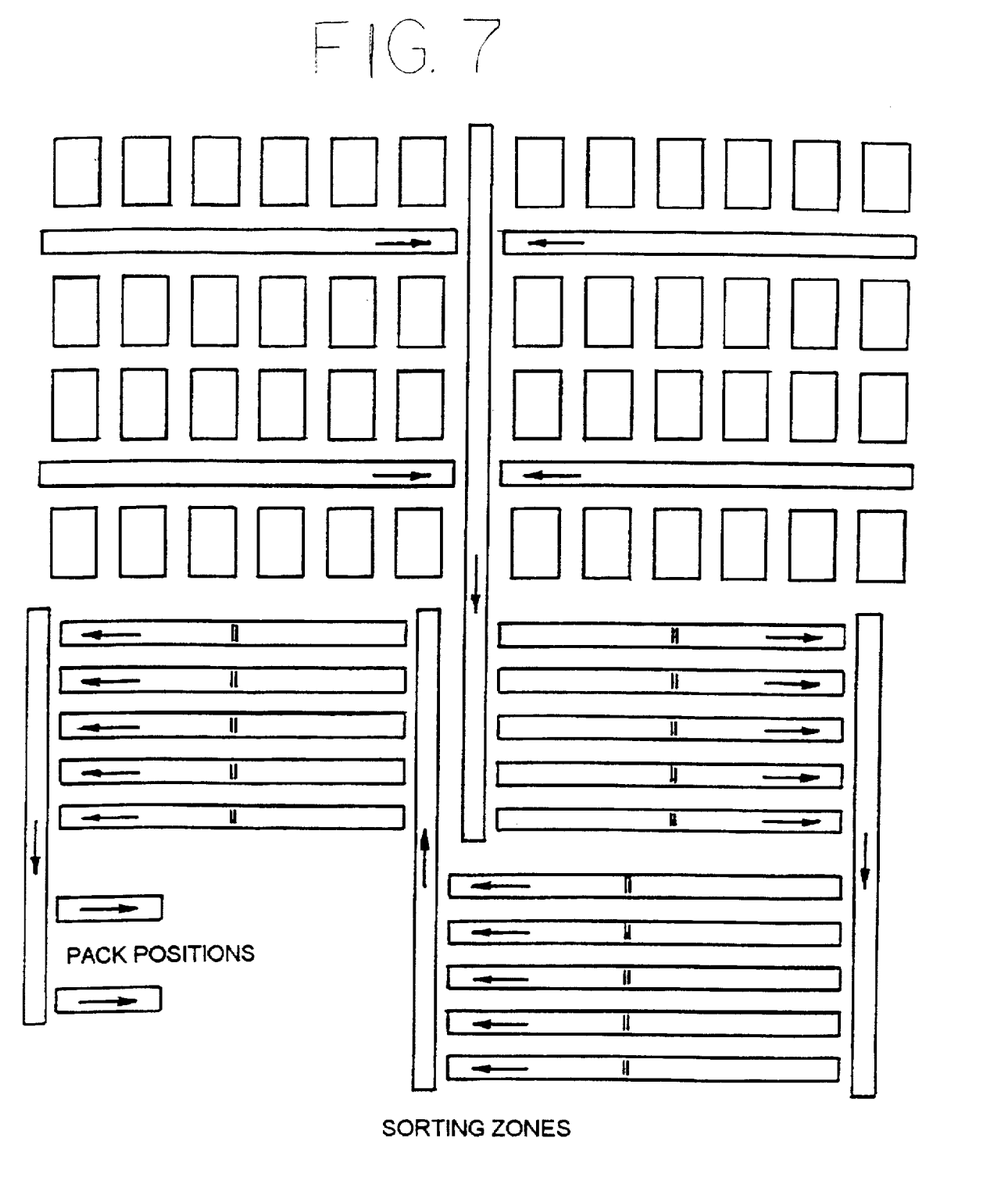
FIG. 7 shows a sorting installation in a commissioning warehouse according to a further embodiment of the invention.

According to FIG. 7, the automatic transfer of the necessary number of packages for each article required for a delivery pass to a continuous conveyor takes place from the commissioning warehouse in such a way that the 125 packages discharged in total, for example, issue in succession from the magazines without gaps. The continuous conveyors are designed for conveying cartons, boxes, cans, etc., for example as belt conveyors. The waiting lines are designed, for example, as roller conveyors with individually driven rollers which can be switched on and off individually so that, from the waiting line at the request of the control system, a package can be conveyed to the transfer point to the relaying belt conveyor and can be received there.

The necessary sorting zones which are connected to one another and to the warehouse region and to the packing positions by belt conveyors are formed by a parallel arrangement of the roller conveyors. In this example according to FIG. 7, the sorting zones each have five waiting lanes with 2×25 waiting positions each.

EXAMPLE 3

In a mail delivery office, incoming mail for each delivery area is to be sorted according to streets, house numbers and individual addresses according to the sequence of the delivery round.

Figure 8:
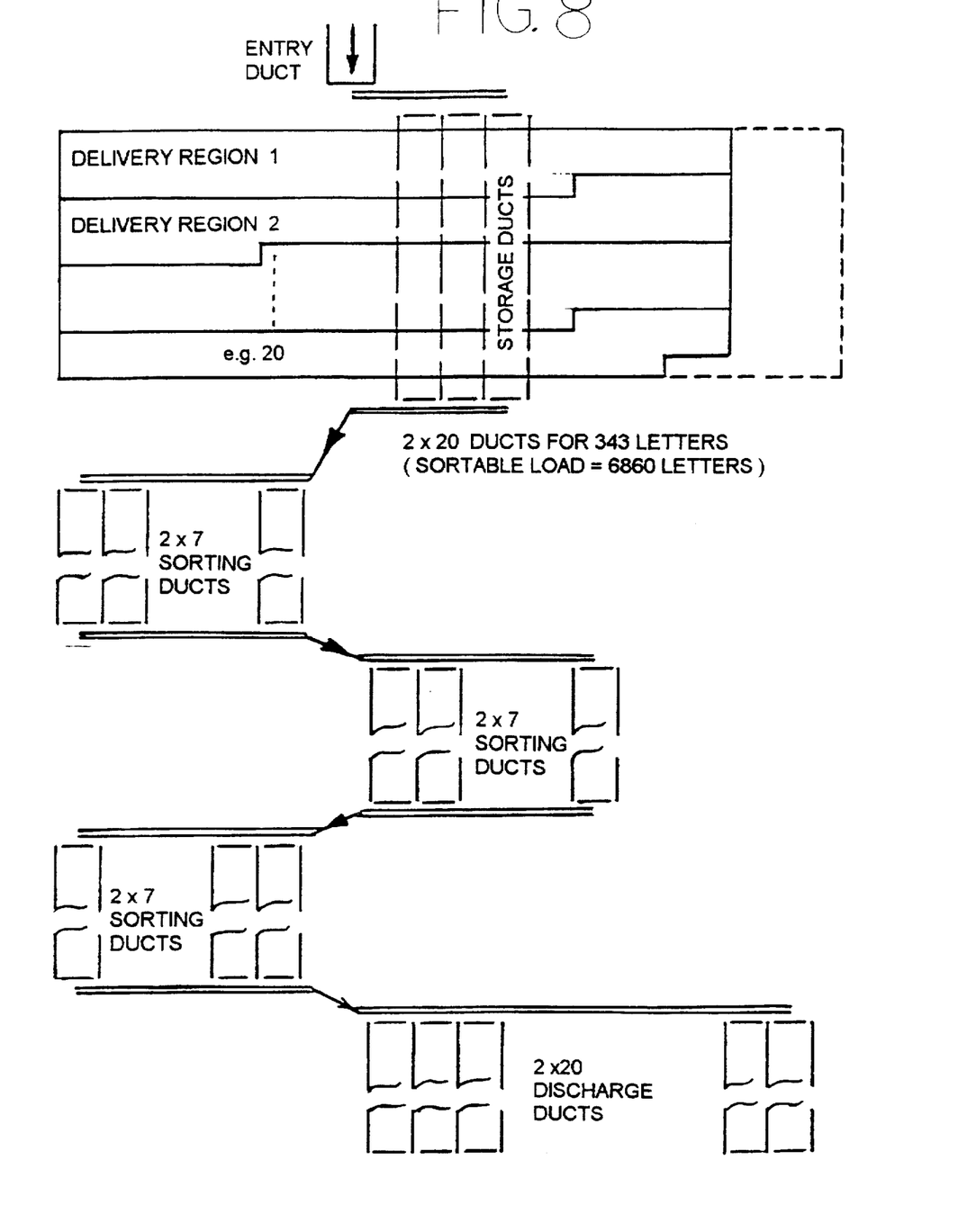
FIG. 8 shows a sorting installation for mail according to a further embodiment of the invention.

With a sortable load according to FIG. 8 of, for example, 6,860 letters, a sorting duct holds 343 letters in the first collecting zone, i.e. 20 ducts are required. 2×7 sorting ducts with a holding capacity of 49 letters in each case are produced as waiting lines for the second, third and fourth collecting zone. 2×18 output ducts should be provided.

According to the foregoing criteria, the position numbers are allocated as in Example 1 and sorting is carried out in collecting zones via the corresponding sorting ducts.

As a result, a sorting sequence is obtained in the manner desired above and therefore a significant simplification in comparison with former complicated manual methods.

What is claimed is:

1. Method of sorting individual articles with a sorting system formed by collecting zones which consist of several waiting lines and are connected to a continuous conveyor, by a control system, deflecting systems before the waiting lines and also consisting of one or more delivery stations within a delivery system after the collecting zones, wherein the individual articles to be sorted are provided with identification numbers containing several identification features of the individual article in coded form and wherein the identification number is read by the control system and evaluated for control of the individual articles by the sorting system comprising the steps of:

(a) following detection of the identification number and before entry into the first collecting zone, allocating each individual article a position number via a control system according to the desired position in the stream of individual articles conveyed from a fourth collecting zone according to feature (e) to the numerically predetermined number of delivery stations;

(b) providing a first collecting zone adapted to the load size(s) of the individual articles to be sorted to hold all individual articles, provided with a position number, from one or more loads in a sequence which is arbitrary but is recorded in the control system, and distributing the individual articles entering the first collection zone over m waiting lines according to a first component of the position number, each waiting line having a holding capacity of q individual articles and m and q being integers;

(c) conveying the individual articles from the waiting lines of the first collecting zone through the connecting continuous conveyor to a second, third and fourth collecting zone with a number of n of waiting lines in each collecting zone with further differentiating distribution according to a second, third and fourth component of the position number, the waiting lines having a respective holding capacity r, and r and n being integers;

(d) supplying via the control system, $q=n^3$ individual parts to each individual waiting line in the first collecting zone and r and $n^2$ individual articles to each individual waiting line in the second, third and fourth collecting zone;

(e) supplying the individual articles present in the waiting lines which are in an ordered sequence owing to the multi-stage distribution procedure, from the fourth collecting zone to a delivery system in which a delivery station invariably only holds individual articles which are to be sorted and correspond to the predetermined fifth component of the position number, and wherein delivery takes place in the sequence of desired identification features;

(f) designing the collecting zones and waiting lines so that the sorting installation configuration correspond to the equation $$M = \frac{m \cdot q \cdot r}{n^2}$$

wherein

M=size of the sorting installation (sortable load)
m=number of waiting lines in the first collecting zone
q=capacity of a waiting line in the first collecting zone
n=number of waiting lines in each further collecting zone
r=capacity of the waiting lines in the further collecting zones.

2. Method according to claim 1, wherein the identical first, second, third, fourth components of the position numbers are retained in the same waiting line or as identically allocated waiting lines of the first, second, third, fourth collecting zone.

3. Method according to claim 1, wherein the delivery takes place individually, group-wise, all per waiting line of the fourth collecting zone.

4. Method according to claim 3, wherein the delivery takes place in parallel or serially.

5. Method according to claim 1, wherein the the sorting speed is identical to the speed of the connecting conveyor.

6. Method according to claim 1, wherein the individual articles are selected from the group consisting of piece goods, clothing, mail, small-package commodities, pallets, medicament packages.

7. Sorting installation for sorting individual articles over collecting zones and waiting lines connected to a continuous conveyor, with a reader as a component of a control system for reading an identification number which is the code for specific identification features, on an individual article to be sorted; deflecting systems before the waiting lines and one or more delivery points within a delivery system after the collecting zones, comprising:

(a) an allocation system as a component of a control system for allocating the identification number to a position number containing the desired position in the stream of the individual articles in the following collecting zones, waiting lines and delivery points;

(b) a first collecting zone adapted to the load size(s) of the individual articles to be sorted for holding all individual articles provided with a position number in one or more loads, the first collecting zone m containing waiting lines for the individual articles according to a first component of the position number which is a presorting feature, each waiting line having a holding capacity q for the item to be sorted and m and q being integers;

(c) a second, third and fourth collecting zone with a number n of waiting lines in each collecting zone according to a second, third and fourth component of the position number which is a further respective differentiating presorting feature, the waiting lines having a respective holding capacity r, and n and r being integers;

(d) control elements as components of a control system with a limit to the input individual articles such that the numerically constantly large load contains the corresponding number of individual articles which issue from the sorting installation in a predetermined sequence, and a blockage after the holding of $q=n^3$ individual parts in each individual waiting line in the first collecting zone and after holding $r=n^2$ individual articles in each individual waiting line in the second, third or fourth collecting zone;

(e) after the fourth collecting zone, a delivery system for the presorted individual articles with a second allocation system as a component of the control system for allocating the position number to the specific delivery point corresponding to the predetermined fifth component of the position number; wherein (f) the number m of waiting lines in the first collecting zone, the capacity q of a waiting line in the first collecting zone, the number n of waiting lines in each further collecting zone, the capacity r of the waiting lines in the further collecting zones are related to the sorting installation configuration M by the following equation $$M = \frac{m \cdot q \cdot r}{n^2}.$$

* * * * *